United States Patent
Gupta et al.

(10) Patent No.: US 9,605,178 B2
(45) Date of Patent: Mar. 28, 2017

(54) PROCESS FOR THE PREPARATION OF A REACTION PRODUCT OF A CYCLIC UREA AND A MULTIFUNCTIONAL ALDEHYDE

(71) Applicant: ALLNEX USA INC., Wilmington, DE (US)

(72) Inventors: Ram Gupta, Stamford, CT (US); Lawrence A. Flood, Norwalk, CT (US); Urvee Y. Treasurer, Stamford, CT (US); Barry A. Lawless, Milford, CT (US); John Colin Brogan, Stamford, CT (US)

(73) Assignee: ALLNEX IP S.À.R.L., Luxembourg (LU)

( * ) Notice: Subject to any disclaimer, the term of this patent is extended or adjusted under 35 U.S.C. 154(b) by 0 days.

(21) Appl. No.: 14/834,761

(22) Filed: Aug. 25, 2015

(65) Prior Publication Data
US 2015/0361296 A1    Dec. 17, 2015

Related U.S. Application Data

(62) Division of application No. 13/876,556, filed as application No. PCT/US2011/053044 on Sep. 23, 2011, now Pat. No. 9,193,885.

(30) Foreign Application Priority Data

Sep. 30, 2010 (EP) .................................... 10185090

(51) Int. Cl.
| | | |
|---|---|---|
| *C08G 12/12* | (2006.01) | |
| *C08G 12/36* | (2006.01) | |
| *C09D 161/24* | (2006.01) | |
| *C09D 167/02* | (2006.01) | |
| *C08G 12/26* | (2006.01) | |

(52) U.S. Cl.
CPC ............ *C09D 167/02* (2013.01); *C08G 12/12* (2013.01); *C08G 12/26* (2013.01); *C08G 12/36* (2013.01); *C09D 161/24* (2013.01)

(58) Field of Classification Search
CPC ....................................................... C08G 12/12
USPC ................... 528/245; 524/597, 512; 427/458
See application file for complete search history.

(56) References Cited

U.S. PATENT DOCUMENTS

| | | |
|---|---|---|
| 4,284,758 A | 8/1981 | North |
| 4,345,063 A | 8/1982 | North |
| 4,395,504 A | 7/1983 | Sulzberg et al. |

FOREIGN PATENT DOCUMENTS

WO    2009/073836    6/2009

OTHER PUBLICATIONS

International Search Report issued Nov. 25, 2011 in International (PCT) Application No. PCT/US2011/053044.
J. Kliegman et al., "Glyoxal Derivatives. V. Reaction of Alcohols with Glyoxal", J. Org. Chem., vol. 38, No. 3, 1973, pp. 556-560.
S. Mahajani et al., "Reaction of Glyoxal with Aliphatic Alcohols Using Cationic Exchange Resins as Catalysts", Organic Process Research & Development, vol. 1, 1997, pp. 97-105.
English abstract of JP No. 53-044567, Apr. 21, 1978.
U.S. Appl. No. 13/823,782 claims.

*Primary Examiner* — Duc Truong
(74) *Attorney, Agent, or Firm* — Wenderoth, Lind & Ponack, L.L.P.

(57) ABSTRACT

This invention relates to a process to make a reaction product UA of at least one multifunctional aldehyde A with at least one cyclic urea U, by mixing the at least one multifunctional aldehyde A with the at least one cyclic urea U in the presence of at least one alcohol $R^1$—OH, and optionally, at least one solvent that has no reactive groups which may react with aldehyde groups, —CO—NH— groups, or hydroxyl groups, to effect an addition reaction to obtain a solution of a product UA, where $R^1$ is selected from the group consisting of linear, branched or cyclic alkyl groups having from one to twelve carbon atoms, to the reaction product obtained by this process, and to a method of use thereof as crosslinker for coating compositions.

12 Claims, No Drawings

PROCESS FOR THE PREPARATION OF A REACTION PRODUCT OF A CYCLIC UREA AND A MULTIFUNCTIONAL ALDEHYDE

This application is a DIV of Ser. No. 13/876,556 filed Mar. 28, 2013 now U.S. Pat. No. 9,193,885.

FIELD OF THE INVENTION

The present invention is directed to a process for the preparation of a reaction product of a cyclic urea and a multifunctional aldehyde. It is also directed to a coating composition comprising the said reaction product, and to a method of use of the said coating composition to provide a coating on a substrate.

BACKGROUND OF THE INVENTION

Industrial coatings are used to protect the surface of a substrate against deterioration brought about by the action of light, humidity, wear, atmospheric oxygen, and other chemicals, and to impart the desired appearance such as colour, gloss, and surface structure. In many cases, such coatings are based on organic polymers which show good adhesion to the substrate and form a film free from defects such as pores or blisters. Film formation, also referred to as drying, is the transition of the coating composition applied to the solid state. The solid film can be formed from a solution by removal of solvent or from a dispersion by removal of the dispersing agent, or from a melt by cooling. In this case, and if no chemical reaction occurs, this is referred to as "physical drying". In the so-called chemical drying, chemical reactions occur during film formation which lead to crosslinked macromolecules. Such crosslinking may be caused by chemical reaction of low molar mass molecules, oligomers or macromolecules between themselves, such as addition or condensation reactions, or radiation induced or thermally induced polymerisation, or by the action of added polyfunctional molecules, the so-called crosslinkers, which react with functional groups of polymers usually referred to as binder resins.

A well-known class of crosslinkers used in conjunction with binder resins having active hydrogen-containing reactive groups, such as hydroxyl and carboxyl groups, are the so-called amino resins, which are hydroxy functional adducts of aldehydes, generally formaldehyde, and organic amino compounds such as triazines, particularly preferably melamine, and urea or derivatives of these, the hydroxyl groups of which are usually at least partially etherified with lower alcohols such as methanol, and n- or iso-butanol. These crosslinkers suffer from the drawback that formaldehyde, inter alia, is liberated during the curing or crosslinking reaction. Emission of formaldehyde is environmentally undesirable. Additionally, these amino resins need temperatures typically of at least 80° C. to act as crosslinkers. Heating to such elevated temperatures is both time-consuming and energy-consuming.

In our investigations leading to the present invention, it has been discovered that by performing the initial condensation reaction between glyoxal and ethylene urea in the presence of at least one alcohol leads to the preparation of at least partially etherified ethylene urea-glyoxal condensed resin. In the Japanese Patent Publication 53-044567, reaction of glyoxal with cyclic urea (2:1 mole ratio) in presence of a strong acid is disclosed. Our attempts at reacting glyoxal with ethylene urea (at a ratio of the amounts of substance of 1.2:1 mol/mol) in presence of a strong acid led to the formation of a rubbery gel-like solid product unusable for surface coating applications. Surprisingly we have discovered that conducting the condensation reaction of glyoxal with ethylene urea, under acidic conditions, in the presence of any alcohol or a mixture of alcohols eliminates the gel formation and results in a product that provides effective cure with hydroxyl and carboxy functional binders under ambient and heat cured conditions. Thus it was possible to make at least partially etherified mono and mixed ether products by this alternate process, wherein the initial condensation step for reacting glyoxal with ethylene urea is not a pre-requisite, for use in surface coating applications.

In the PCT application WO2009/073836 A1, a process is disclosed for the preparation of etherified crosslinkers based on reaction products of cyclic ureas and acetals or hemiacetals of multifunctional aldehydes having at least two aldehyde groups which can be used in coating compositions comprising active hydrogen containing resins, such as hydroxy functional alkyd, acrylic, urethane or epoxy resins, and which coating compositions can be cured with such crosslinkers even at ambient temperature. The coatings prepared therewith showed good stability against solvents, and were not prone to yellowing. This process makes use of a multi-step reaction sequence where in the first step, the aldehyde component is mixed with an alcohol, and reacted under acidic conditions leading to formation of hemiacetals and acetals, and then in the second step, this mixture is reacted with a cyclic urea which may be preformed, or formed in situ. Depending on the reaction time, reaction conditions, and storage time in the first step, the hemiacetals and acetals may undergo oligomerisation, disproportionation and condensation reactions, leading to formation of a mixture of individual compounds such as mono- and diacetals of monomeric, dimeric or trimeric glyoxal, esters of glyoxylic acid, and glycolates. See S. Mahajani and M. M. Sharma in Organic Process Research and Development, 1997, No. 1, pages 97 to 105; and J. M. Kliegman and R. K. Barnes, *J. Org. Chem.*, Vol. 38 (1973), No. 3, pages 556 et seq. The composition of this mixture has been found to be difficult to control. Owing to the presence of aldehyde only in the form of its acetals or hemiacetals, the addition products formed by a process as described in WO2009/073836 A1 are different from those obtained by addition reaction of a multifunctional aldehyde and a cyclic urea.

It is therefore of the object of this invention to provide addition products of a cyclic urea and glyoxal and/or other multifunctional aldehydes having at least two aldehyde groups per molecule that can be used as crosslinkers for coating compositions having hydroxyl and/or acid functionality, which do not have the disadvantages mentioned supra.

SUMMARY OF THE INVENTION

This object has been achieved by providing a process for the preparation of a reaction product of a cyclic urea and a multifunctional aliphatic aldehyde which process comprises the step a) of mixing the at least one multifunctional aldehyde A with the at least one cyclic urea U in the presence of at least one alcohol $R^1$—OH and effecting an addition reaction to obtain a product UA.

The multifunctional aldehyde A has the formula OHC—R'—CHO where R' may be a direct bond or an aliphatic divalent radical which may be linear, branched or cyclic and may have from one to twenty carbon atoms, both these options for R' leading to a divalent aldehyde having exactly two —CHO groups, or an aliphatic divalent radical which may be linear, branched or cyclic and may have from one to twenty carbon atoms, and carries at least one additional aldehyde group —CHO, which latter option leads to trivalent or polyvalent aldehydes having at least three aldehyde groups.

The cyclic urea U is selected from the group consisting of ethylene urea, 1,3-propylene urea, 1,2-propylene urea, 1,4-butylene urea, and glycol uril.

This addition reaction can be conducted in a pH range of more than 7.5 which is referred to as "basic" medium, or in a range of from 4.5 to 7.5 which is referred to a "weakly acidic to neutral" medium, and also in a pH range of less than 4.5 which is referred to as "acidic" medium. In the latter case, and to a lesser extent, also in the neutral medium, at least some etherification will occur involving the added alcohol and a hydroxyl group generated upon addition of the aldehyde to a group —CO—NH— of the cyclic urea to form an ether structure

Formation of ethers can be enhanced by using a more acidic medium. It is also possible, in a further embodiment of this invention, to conduct a multi-step etherification where the same alcohol can be used in more than one etherification step, or a different alcohol may be used in a later etherification step. This process of the invention leads to high degree of etherification.

"Etherified" means here in a product of an addition reaction of an aldehyde to a cyclic urea (X being the residue of a cyclic urea which may have been reacted with a multifunctional aldehyde or may also be part of a polymer or an oligomer chain, after taking out a —CO—NH— group):

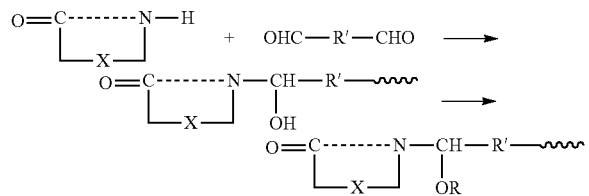

that a hydroxyl group bonded to a carbonyl carbon atom of an aldehyde molecule (denoted by bold print "C" in the formulae supra) which is generated in the addition reaction is replaced by an alkoxy group —OR. The (growing) polymer chain is denoted by "~~~~".

In the preferred case of using ethylene urea as cyclic urea, and glyoxal as multifunctional aldehyde, —R'— is a direct bond, and —X— is —NH—$CH_2$—$CH_2$—.

"Partially etherified" means here that both —OH and —OR groups bonded to carbonyl carbon atoms of the aldehyde are present in such "partially etherified" product, which at least partially etherified reaction product has as substituents on the carbonyl carbon atoms of the aldehyde A at least one kind of functional groups selected from the group consisting of hydroxyl groups —OH and alkoxy groups —OR.

In this invention, the groups —OR may preferably comprise alkoxy groups —$OR^1$ and —$OR^2$, where $R^1$ and $R^2$ are both selected independently from each other from the group consisting of linear, branched or cyclic alkyl groups having from one to twelve carbon atoms, which may be interrupted by one or more of —O—, —NR"—, —S—, where R" stands for H, or an alkyl group having from one to six carbon atoms, with the proviso that not two —O— or not two —S— atoms may be immediately adjacent, where in a first embodiment, $R^1$ and $R^2$ are different from each other, and $R^2$ has at least one carbon atom more than $R^1$, or in a second embodiment, $R^1$ and $R^2$ are the same.

In the addition reaction according to the invention, the ratio of the amount of substance of aldehyde groups in the multifunctional aldehyde A to the amount of substance of —CO—NH— groups in the cyclic urea U is preferably between 0.2 mol/mol and 4 mol/mol.

DETAILED DESCRIPTION OF THE PREFERRED EMBODIMENTS

The process to make a reaction product UA of at least one multifunctional aldehyde A with at least one cyclic urea U, comprises a) mixing the at least one multifunctional aldehyde A with the at least one cyclic urea U in the presence of at least one alcohol $R^1$—OH to effect an addition reaction, optionally, in the presence of at least one solvent that has no reactive groups which may react with aldehyde groups, —CO—NH— groups, or hydroxyl groups, to obtain a solution of a product UA, where $R^1$ is selected from the group consisting of linear, branched or cyclic alkyl groups having from one to twelve carbon atoms which may be interrupted by one or more of —O—, —NR"—, —S—, where R" stands for H, or an alkyl group having from one to six carbon atoms, with the proviso that not two —O— or not two —S— atoms may be immediately adjacent.

The aliphatic alcohols R—OH useful for the invention have at least one hydroxyl group, and from one to twelve carbon atoms, preferably one to eight carbon atoms, which may be interrupted by one or more of —O—, —NR"—, —S—, where R" stands for H, or an alkyl group having from one to six carbon atoms, with the proviso that not two —O— or not two —S— atoms may be immediately adjacent. They can be linear, branched or cyclic, preferably linear or branched, are preferably monoalcohols and preferably have from one to twelve, preferably one to eight carbon atoms, such as methanol, ethanol, n- and iso-propanol, and the isomeric butanols, particularly n-butanol, and iso-butanol, n-hexanol, or 2-ethylhexanol. Other preferred alcohols are etheralcohols of the formula $R^3$—(O—$C_nH_{2n}$)$_m$—OH where $R^3$ is an alkyl group having preferably from one to four carbon atoms, n is an integer of from 2 to 4, and m is an integer of from 1 to 10, such as ethylene glycol monomethylether, ethylene glycol monobutylether, triethylene glycol monoethylether, or dipropyleneglycol monomethylether. Among the cyclic aliphatic alcohols, cyclohexanol is preferred. A small amount, i. e. up to a mass fraction of 10% of the aliphatic alcohols used, may be difunctional or polyfunctional (having a functionality of three or more).

At least two different such alcohols $R^1$—OH and $R^2$—OH have to be used to prepare an at least partially etherified reaction product UA of cyclic ureas U and multifunctional aldehydes A according to one embodiment of the invention, the molar ratio n($R^1$—OH)/n($R^2$—OH) of these being from 1 mol/99 mol to 99 mol/1 mol, preferably from 10 mol/90 mol to 90 mol/10 mol, and particularly preferably from 25 mol/75 mol to 75 mol/25 mol. The aliphatic alcohol $R^2$—OH has at least one carbon atom in its molecule more that there is in $R^1$—OH. In a preferred embodiment, methanol is used as $R^1$OH, where $R^2$—OH may be ethanol, or a higher homologue thereof having up to twelve carbon atoms, including branched and cyclic aliphatic monoalcohols. Preferred as R²—OH are ethanol, n- and iso-propanol, n-butanol, sec.-butanol, iso-butanol, n-pentanol, 2- and 3-methyl-1-butanol, n-hexanol, n-octanol, 2-ethyl-1-hexanol, 1-decanol, 1-dodecanol, and mixtures of these, as well as ether alcohols such as ethylene glycol monomethylether, ethylene glycol monobutylether, triethylene glycol monoethylether, or dipropyleneglycol monomethylether. If methanol is used as R¹OH, the molar ratio n(R¹—OH)/n (R²—OH) of these are especially preferably from 15 mol/85 mol to 45 mol/55 mol, preferably from 20 mol/80 mol to 40 mol/60 mol. It is further preferred that the alcohol R¹—OH is significantly water-miscible, meaning that mixtures of water and R¹—OH form homogeneous mixed phases. It is further preferred that the alcohol R²—OH has at most limited solubility in water, limited solubility meaning that the aqueous phase does not contain a mass fraction of more than 30% of the alcohol R²—OH.

The multifunctional aldehydes A have at least two aldehyde groups, obeying the formula OHC—R'—CHO, and are preferably aliphatic in nature. R' is in this case a direct bond or a divalent aliphatic radical having from one to ten carbon atoms. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal. Glyoxal may be used for this invention in aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions.

The cyclic ureas U which may be used according to the present invention have at least one unsubstituted >NH group. These cyclic ureas U are cycloaliphatic or bicycloaliphatic compounds having an element of the structure >N—CO—N< within a ring structure, at least one of the nitrogen atoms carrying a hydrogen atom, the total number of ring atoms being from 5 to 7 for the monocyclic ureas (ethylene urea, 1,2-propylene urea, 1,3-propylene urea, 1,4-butylene urea or tetramethylene urea). Particularly preferred is ethylene urea. In the case of a bicyclic compound, the urea is glycoluril or acetylene diurea.

It has been found that when using purified cyclic ureas instead of commercially available qualities, e. g. commercial ethylene urea which has about 96% purity (the mass fraction of ethylene urea in one commercially available product is (96.0±0.5) %), both colour and stability of the reaction product with multifunctional aldehydes are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality.

It is also possible to add boric acid to the crosslinker composition of the present invention which can improve the colour of the reaction products UA or their solutions. It is also possible, with good results, to add boric acid in two portions, one portion to the cylic urea U, and a further portion to the multifunctional aldehyde A. It has been found that the optimum quantity of boric acid, measured as the ratio of the mass $m_B$ of boric acid $H_3BO_3$, to the sum $m_{UA}$ of the mass of multifunctional aldehyde A and the mass of cyclic urea U is from 0.2% to 20%, preferably from 0.5% to 10%, and particularly preferred, from 1% to 5%. Combining binder resins with such boric acid-modified reaction products UA as crosslinkers leads to coatings having particularly low yellowness index, and good colour retention. It is, of course, also possible to add boric acid to the binder resin to be crosslinked with reaction products UA, or to the mixture of binder resin and crosslinker.

In a preferred variant, the process is conducted such that after the addition reaction of the cyclic urea U and the multifunctional aldehyde A referred to as step a), b) the pH is adjusted to at most 5.0
c) optionally, a further quantity of the said aliphatic alcohol R¹—OH is added; and optionally, at least one solvent is added that has no reactive groups which react with aldehyde groups, amide groups, or hydroxyl groups; and etherification is conducted under acid conditions
d) a further aliphatic alcohol R²—OH is added which has at least one carbon atom in its molecule more than there is in R¹—OH; optionally, at least one solvent is added that has no reactive groups which react with aldehyde groups, amide groups, or hydroxyl groups; and etherification is conducted under acid conditions, wherein the steps c), and/or d) may be repeated one or more times.

In the process according to the invention, the following additional preferred measures may be realised, singly, or in any combination:

the multifunctional aldehyde A is charged first,
the cyclic urea U is charged first,
water may be added to the multifunctional aldehyde A, or to the cyclic urea U, or to their mixture the pH of the mixture of the multifunctional aldehyde A and the cyclic urea U may preferably be adjusted to not more than 7.5, particularly preferably not more than 6.0, and most preferred, to not more than 4.5,
the mixture of the cyclic urea U and the multifunctional aldehyde may be heated to from ambient to less than 80° C., preferably, to between 35° C. and 50° C.,
the mass of cyclic urea U and the mass of aldehyde A present in the reaction mixture are preferably chosen such that the following condition is met for ratio of the amount of substance n (—CHO) of aldehyde groups in the multifunctional aldehyde, and, in the case of mixtures of aldehydes, and the amount of substance of —CO—NH— groups in the cyclic urea U:
0.8 mol/mol≤n(—CHO)/n(—CO—NH—)≤1.40 mol/mol
and particularly preferably,
1.0 mol/mol≤n(—CHO)/n(—CO—NH—)≤1.30 mol/mol,
the aliphatic alcohol R¹—OH is added preferably in an amount such that the ratio of the amount of substance of alcohol R¹—OH, n(R¹—OH) to the amount of substance of aldehyde groups in the multifunctional aldehyde A is from 0.6 mol/mol to 20 mol/mol,
a second alcohol R²—OH is added after an etherification stage where alcohol R¹—OH has been used,
the pH during the etherification or alkylation reaction is preferably below 5, particularly preferably to below 3.0,
etherification is preferably effected between 25° C. and 100° C., most preferably, between 40° C. and 45° C.,
water formed during etherification, and the unreacted alcohol are removed during or after the etherification, preferably by distillation under reduced pressure, and further preferably, at a temperature between 50° C. and 80° C.

if water and alcohol are removed during etherification, the alcohol is preferably recycled after reaction and optional removal of unreacted alcohol and of water, the reaction mixture is preferably cooled to obtain a solution of an at least partially etherified reaction product of an aliphatic multifunctional aldehyde A and a cyclic urea U, and the ratio of the amount of substance n (—O—$R^2$) of alkoxy groups —O—$R^2$ to the amount of substance n (—O—$R^1$) of alkoxy groups —O—$R^1$ in the etherified product of this process is between 0.11 mol/mol and 20 mol/mol.

Particularly good results have been obtained when combining two or more of these preferred embodiments.

If a solid precipitate or a suspended solid is formed during the reaction, this solid matter is preferably separated by any of the usual processes such as centrifugation, or filtration.

In a further preferred variant, in the process for making the reaction product UA, after the addition reaction of step a), b) the pH is adjusted to at most 5.0 c) a further quantity of the said aliphatic alcohol $R^1$—OH is added; optionally, further at least one solvent is added that has no reactive groups which react with aldehyde groups, amide groups, or hydroxyl groups; and etherification is conducted under acid conditions wherein step c) may be repeated one or more times.

The addition reaction of the cyclic urea U and the multifunctional aldehyde A can be conducted under neutral, acid, and basic conditions. The reaction rate can be enhanced by increasing the temperature, preferably to a range of from 25° C. to 120° C., or by adding a catalyst which may be a base, preferably a weak inorganic base such as sodium bicarbonate, or an acid such as sulphuric acid or acetic acid.

The addition reaction of the cyclic urea U and the multifunctional aldehyde A can also be conducted, in a preferred variant, in the presence of at least one solvent that has no reactive groups which react with aldehyde groups, amide groups, or hydroxyl groups. Such solvents are preferably aromatic hydrocarbon solvents such as toluene, xylene, ethyl benzene, alkylated naphthalene compounds, aliphatic ethers and esters, such as alkyl ethers of monomeric and oligomeric ethylene and propylene glycols, esters of aliphatic acids having from one to ten carbon atoms and alkoxyalkanols having from three to fifteen carbon atoms such as methoxypropyl acetate, aliphatic ketones having from three to twelve carbon atoms such as methyl isobutyl ketone.

A particularly preferred combination is glyoxal reacted with ethylene urea, and optionally, either glyoxal, or ethylene urea, or both, in mixture with other multifunctional aldehydes and/or other cyclic ureas.

Repetition of an etherification step, i. e. addition of alcohol and further etherification after optional removal of water and unreacted alcohol, has been found to increase the degree of etherification. This repetition is particularly preferable in the case of only one alcohol being used for etherification. Double or triple or multiple etherification, the number of repetitions being selected to reach the desired degree of etherification, is therefore a preferred method.

The reaction product UA is characterised in that its degree of etherification, measured as the ratio n(—O—R)/n(U) of the amount of substance n(—O—R) of alkoxy groups to the amount of substance n(U) of cyclic urea U chemically bound in the reaction products, is preferably at least 0.01 mol/mol, wherein the amount of substance of alkoxy groups is equal to the amount of substance n (—O—$R^1$) of alkoxy groups —O—$R^1$ present in the etherified product, or, if alkoxy groups —O—$R^2$ are present, the sum of the amount of substance n (—O—$R^1$) of alkoxy groups —O—$R^1$ and the amount of substance n (—O—$R^2$) of alkoxy groups —O—$R^2$ present in the etherified reaction product.

It has also been found that higher molar mass reaction products UA can be made by a process variant, where in step a), the amount of multifunctional aldehyde A added is less than 90% of the stoichiometric amount needed, preferably between 20% and 80% of the stoichiometric amount needed, and particularly preferably, between 30% and 70% of the stoichiometric amount needed, and that after step a), a further quantity of multifunctional aldehyde A is added and reacted with the reaction mixture formed in step a) wherein the total amount of multifunctional aldehyde A added is chosen such that the ratio of the amount of substance of aldehyde groups n(—CHO) in the multifunctional aldehyde A and the amount of substance of groups n(—CO—NH) in the cyclic urea U is from 0.2 mol/mol to 4 mol/mol, and preferably, from 0.8 mol/mol to 1.4 mol/mol, and particularly preferably, from 1.0 mol/mol to 1.3 mol/mol.

In a preferred variant, after an etherification step, at least a part of the unreacted alcohol and optionally, at least a part of the water present, and further optionally, at least a part of the at least one solvent that has no reactive groups which react with aldehyde groups, amide groups, or hydroxyl groups, is removed by distillation.

In a further preferred variant, after an etherification step, at least a part of the unreacted alcohol and optionally, at least a part of the water present, and further optionally, at least a part of the at least one solvent that has no reactive groups which react with aldehyde groups, amide groups, or hydroxyl groups, is removed by azeotropic distillation wherein a solvent is added that is immiscible with water in a way that it forms a phase separate from an aqueous phase containing at least a part of the water separated by distillation, wherein the phase different from the aqueous phase is recycled to the distillation still, or back to the reactor.

The reaction products thus obtained can be combined as crosslinker composition both with solvent borne and with water borne binder resins having active hydrogen functionality (preferably hydroxyl or carboxylic acid groups). When methanol or ethanol, alone or in combination, are used as etherifying alcohol, the resulting crosslinker compositions are particularly useful in combination with water-borne crosslinkable resins. Use of higher alcohols such as propanol or butanol makes the crosslinker composition more compatible with solvent-borne crosslinkable resins. It was found that the crosslinker compositions prepared according to the invention have a higher reactivity and, when appropriately catalysed, can be used for curing even at room temperature, and that the appearance of the cured films is also favourable for the crosslinkers according to the present invention, in yellowness and gloss and haziness.

Coating compositions are prepared by admixing the reaction product UA to a polymeric binder resin having active hydrogen atoms, i. e. at least one of hydroxyl groups, acid groups, preferably carboxyl groups, carbamate groups, amide groups, imide groups, amino groups, imino groups, mercaptan groups, or phosphine groups. The resulting mixture which preferably comprises catalysts and optionally, further additives, is homogenised, and applied to a substrate by spraying, brushing, wire coating, curtain coating, blade coating, roll coating, dipping, electrophoretic deposition, powder spraying, or electrostatic spraying.

Suitable catalysts are preferably acid catalysts, particularly those selected from the group consisting of organic sulphonic acids, organic phosphonic acids, organic sulphonimides, and Lewis acids, or salts or complexes of Lewis acids such as amine salts or ether complexes. Useful catalysts are para-toluene sulphonic acid (pTSA), dodecylbenzene sulphonic (DDBSA), dinonylnaphthalene sulphonic acid (DNNSA), and dinonyl naphthalene disulphonic acid (DNNDSA), which may also be blocked with volatile amines. Particularly preferred are N-methylsulphonyl-p-toluenesulphonamide (MTSI), para-toluene sulphonic acid (pTSA), dodecylbenzene sulphonic (DDBSA), dinonylnaphthalene sulphonic acid (DNNSA), and dinonyl naphthalene disulphonic acid (DNNDSA). Blocked acid catalysts where the acid is liberated e. g. by heating can, of course, also be used, such as acid esters or reaction products of acids and epoxide functional compounds. Particularly useful catalysts are acid catalysts, such as toluene sulphonic acid, or dinonyl naphthalene disulphonic acid, which are usually dissolved in alcohol.

The ratio of mass of solid binder resin to the mass of the reaction products UA is preferably from 99/1 to 50/50, particularly preferably from 95/5 to 60/40, and most preferred, from 90/10 to 70/30.

It has been verified that the crosslinker compositions according to the invention can be combined with solvent borne or water borne binder resins having active hydrogen atoms (these resins collectively also referred to hereinafter as "active hydrogen material") which are preferably hydrogen atoms in hydroxy or carboxylic acid functionality, or both, particularly with hydroxy or carboxylic acid functional alkyd resin, hydroxy or carboxylic acid functional acrylic resins, hydroxy functional polyurethane resins, and hydroxy functional epoxy resins, to generate a curable composition which can be used as constituent for a coating composition.

Suitable active hydrogen-containing materials include, for example, polyfunctional hydroxy group containing materials such as polyols, hydroxyfunctional acrylic resins having pendant or terminal hydroxy functionalities, hydroxy-functional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxyfunctional resins include CRYLCOAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith.

As these crosslinker compositions when adequately catalysed are active already at ambient temperature (20° C. to 25° C.), they are particularly useful to cure coatings on heat sensitive substrates, such as paper, cardboard, textiles, leather, wood, fabricated wood, and also plastics. They also work, of course, as crosslinkers for coating compositions that are used on substrates such as metals, stone, plaster, glass, ceramics, and concrete which allow higher curing temperatures. Application of said crosslinker composition in combination with the binder resins mentioned supra can also be considered where cure temperature or energy savings are an issue. Usual additives such as catalysts, defoamers, light stabilisers, fillers, antiskinning agents, antisettling agents, adhesion promoters, wetting agents, sag control agents, and pigments can, of course, be used in coating compositions comprising the crosslinker compositions of the present invention. Particularly useful catalysts are acid catalysts, such as toluene sulphonic acid, or dinonyl naphthalene disulphonic acid, which are usually dissolved in alcohol. The curable compositions of this invention may preferably be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. Suitable surfaces include metals such as steel and aluminum, plastics including thermoplastics and thermosets, textiles, wood, ceramics and glass. They can also be used in electronic applications, including coatings for metallised circuit boards, semiconductor surfaces, displays, and packaging for electronic circuitry.

This favourable performance could not have been expected from the choice of the parameters according to the invention for the at least partially etherified reaction products of multifunctional aldehydes A and cyclic ureas U.

It is also possible to use the reaction products UA as crosslinker for substrates selected from the group consisting of paper, textiles, wood, fabricated wood, leather, or cellulosic materials, comprising mixing at least one of catalysts, fillers, wetting agents, solvents, and diluents, to the reaction product UA to form a crosslinker composition, and applying the crosslinker composition to the substrate.

Further preferred variants of this invention are claimed in the dependent claims.

EXAMPLES

The following examples illustrate the invention, without intending to limit. All concentrations (strengths) and ratios stated in "%" are mass fractions (ratio of the mass $m_B$ of a specific substance B, divided by the mass m of the mixture, in the case of a concentration, or by the mass $m_D$ of the second substance D, in the case of a ratio). The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol".

$^{13}$C-NMR analyses have been done with a Bruker-Oxford Avance II 400 NMR spectrometer with a 100 mm probe. Samples were prepared by diluting the reaction products with approximately the same mass of dimethyl sulphoxide-$d_6$.

Measurement of molar mass of the reaction products UA was done by HPSEC, or gel permeation chromatography, using tetrahydrofuran as solvent, at a sample concentration of 1 g/100 ml, a flow of 1.0 ml/min, a column temperature of 40° C., and refractometric detection, using a set of crosslinked polystyrene bead filled columns having a particle diameter of 5 im, with pore sizes of 100 nm (1×), 50 nm (2×), and 10 nm (3×), providing a measuring range of from 100 g/mol to 50 kg/mol, for calibration with polystyrene standards. Data collection and analysis was made with a software provided by Polymer Standards Service WinGPC system.

Example 1

2-Imidazolidinone-Ethanedial Resin in Water 210 g (1.45 mol) of an aqueous of glyoxal solution with a mass fraction of solids of 40% were charged to a 0.5 L reaction vessel under a nitrogen purge. 115 g (1.19 mol) of ethyleneurea hemihydrate were added, the pH was noted to be 3.0. The reaction temperature was raised to (50±5° C. In less than thirty minutes, a very viscous reaction mass was formed which was found to be practically insoluble in water and other solvents.

Example 2

Mixed Methyl and Butyl Ether of 2-Imidazolidinone-Ethanedial Resin

A mixed ether resin according to process of the invention was prepared by the following procedure: 210 g (1.45 mol) of an aqueous of glyoxal solution with a mass fraction of solids of 40% were charged to a 2 L reaction vessel under a nitrogen purge. 448 g (14.0 mol) methanol were then added. 115 g (1.19 mol) of ethyleneurea hemihydrate were added next. The pH was adjusted to 3.0 with aqueous sulphuric acid solution having a mass fraction of solids of 25%. The reaction temperature was raised to (48±3° C. and held for four hours under stirring. At the end of four hours the pH was adjusted to 7.0 by adding aqueous sodium hydroxide solution having a mass fraction of solids of 25%. Excess methanol and water were removed slowly at reaction temperature and under reduced pressure of 80 kPa linearly decreasing to 29 kPa (600 mm Hg ramped to 220 mm Hg) until a mass fraction of approximately from 36% to 40% of the total reaction mass had been removed. 75 g (1 mol) of n-butanol were added to the reaction mixture, the reaction temperature was then raised (55±5°) C. and removal of excess methanol and water was continued under reduced pressure of 24 kPa linearly decreasing to 6.7 kPa (180 mm Hg ramped to 50 mm Hg) until a mass fraction of solids of 60% was obtained. The resulting product solution was filtered. The viscosity was determined to be 820 mPa·s. The degree of etherification of the resulting yellow crosslinker solution (316 g) was determined by $^{13}$C-NMR as n(—O-Alkyl)/n(EU)=1.49 mol/mol; "EU" stands for ethylene urea, and the molar mass by HPSEC as $M_w$=1793 g/mol, where $M_w$ stands for the weight average molar mass. The fraction of the area in the graph of refraction number difference versus elution volume commonly provided in a high performance size exclusion analysis (also referred to as gel permeation chromatography) of the low molar mass range (below a molar mass of 1 kg/mol) was 46%. The ratio of the amount of substance of n-butoxy groups to the amount of substance of methoxy groups in the reaction products was 0.51 mol/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

Example 3

Ethyl Ether of 2-Imidazolidinone-Ethanedial Monoether Resin

A mono ether resin according to the process of the invention was prepared by the following procedure: The procedure of Example 2 was repeated by using ethanol in place of methanol and n-butanol. The resulting product solution was filtered. The product was a clear viscous resin with a mass fraction of solids of about 65%. The degree of etherification was determined by $^{13}$C-NMR as n(—O-Alkyl)/n(EU)=1.57 mol/mol; and the molar mass by HPSEC as $M_w$=1570 g/mol.

This monoether product of example 3 when evaluated in ambient and heat cured surface coating applications resulted in coating films with good appearance, satisfactory resistance properties in solvent borne coating compositions with superior formulation stability. It was further demonstrated that this product can also be used as crosslinker with waterborne acrylic polymer resulting in coatings with good appearance and satisfactory performance.

Example 4

Mixed Methyl and Butyl Ether of 2-Imidazolidinone-Ethanedial Resin

A mixed ether resin according to the process of the invention was prepared by repeating the procedure of Example 2, but adding a base catalyst, solid sodium bicarbonate following the charge of glyoxal and alcohol running the reaction under basic conditions at a pH of from 7 to 7.5) to effect the initial condensation in presence of alcohol, followed by acid catalysed etherification.

190 g (1.31 mol) of an aqueous of glyoxal solution with a mass fraction of solids of 40% were charged to a 2 L reaction vessel under a nitrogen purge. 226 g (7.05 mol) methanol and 522 g (7.05 mol) of n-butanol were added. The pH was adjusted to from 7 to 7.5 by adding solid sodium bicarbonate. 115 g (1.19 mol) of ethyleneurea hemihydrate were added. The reaction temperature was raised to (40±3°) C. and held for two hours under stirring. The pH was the adjusted to 3.0 by adding aqueous sulphuric acid solution with a mass fraction of solids of 25%. The reaction temperature was raised to (48±3°) C. and held for four hours under stirring. At the end of four hours the pH was adjusted to 7.0 by adding aqueous sodium hydroxide solution with a mass fraction of solids of 25%. Excess alcohol and water were removed slowly at reaction temperature and under reduced pressure of from 80 kPa linearly decreasing to 29 kPa (600 mm Hg ramped to 220 mm Hg) until a mass fraction of 38% of the total reaction mass had been removed. 100 g (1.35 mol) of n-butanol were added to the reaction mixture, the reaction temperature was then raised to (60±5) °C. and removal of excess methanol and water was continued under reduced pressure of 24 kPa linearly decreasing to 6.7 kPa (180 mm Hg ramped to 50 mm Hg) until a mass fraction of solids of 63% was obtained. The resulting product solution was filtered. The viscosity was determined to be 1400 mPa·s. The degree of etherification of the resulting yellow crosslinker solution (268 g) was determined by $^{13}$C-NMR as n(—O-Alkyl)/n(EU)=1.66 mol/mol; and the molar mass by HPSEC as $M_w$=2971 g/mol. The fraction of the area in the graph of refraction number difference versus elution volume commonly provided in a high performance size exclusion analysis (also referred to as gel permeation chromatography) of the low molar mass range (below a molar mass of 1 kg/mol) was 25%. The ratio of the amount of substance of n-butoxy groups to the amount of substance of methoxy groups in the reaction products was 0.78 mol/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

Example 5

Mixed Methyl and Butyl Ether of
2-Imidazolidinone-Ethanedial Resin

A mixed ether resin according to process of the invention was prepared by repeating the procedure of Example 2 without adding any acid or base catalyst, following the charge of glyoxal and alcohol running the reaction at the natural pH of the mixture (pH ranging between 3.8 to 5.0 in several runs of this experiment) to effect the initial condensation in the presence of alcohol, followed by acid catalysed etherification.

A mixed ether product with a mass fraction of solids of 60% was obtained. The resulting product solution was filtered. Its viscosity was determined to be 1024 mPa·s. The degree of etherification of the resulting yellow crosslinker solution (353 g) was determined by $^{13}$C-NMR as n(—O-Alkyl)/n(EU)=1.25 mol/mol; and its molar mass by HPSEC as $M_w$=757 g/mol. The ratio of the amount of substance of n-butoxy groups to the amount of substance of methoxy groups in the reaction products was 0.81 mol/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

Example 6

Mono Butyl Ether of 2-Imidazolidinone-Ethanedial
Resin

A mixed ether resin according to process of the invention was prepared by repeating the procedure of Example 2 without adding any acid or base catalyst, following the charge of glyoxal and alcohol running the reaction at the natural pH of the mixture (pH ranging between 3.8 to 5.0 in several runs of this experiment) to effect the initial condensation in the presence of alcohol, followed by acid catalysed etherification.

A mixed ether product with a mass fraction of solids of 60% was obtained. The resulting product solution was filtered. Its viscosity was determined to be 250 mPa·s. The degree of etherification of the resulting yellow crosslinker solution (353 g) was determined by $^{13}$C-NMR as n(—O-Alkyl)/n(EU)=1.62 mol/mol; and its molar mass by HPSEC as $M_w$=1099 g/mol.

This mixed ether product when evaluated in ambient and heat cured surface coating applications resulted in coating films with good appearance, satisfactory resistance properties comparable to formulations using amino-formaldehyde resins as crosslinkers and superior formulation stability.

Example 7

Preparation of Coating Compositions 52.5 g of a short oil alkyd resin (BECKOSOL® 12035, having a mass fraction of solids of 60%, dissolved in xylene, an acid number of 12 mg/g and a hydroxyl number of 155 mg/g) based on coconut oil were charged to a vessel fitted with a suitable mixing device, followed by addition of 22.4 g of butyl acetate as solvent and 2.25 g of a catalyst solution (para-toluene sulphonic acid "pTSA" dissolved in isopropanol, at 40% strength). 22.0 g of the crosslinker of Example 2 were added along with 0.9 g of methoxypropanol as additional solvent and stirred to provide a coating formulation with a mass fraction of solids of 45% and an overall mass ratio of binder to crosslinker of 70/30. The paint formulation was stable for more than forty-eight hours.

Films were prepared by applying this coating composition to the surface of 101.6 mm×152.4 mm (4"×6") clean glass panels and to the surface of white Leneta cards, using a wire-wound coating bar #65 to drawdown the applied formulation resulting in a uniform film. The coated panels were then allowed to flash at room temperature for either twenty-four hours at ambient conditions (20° C. to 25° C.), or were cured for five minutes at 65° C., and film properties measured twenty-four hours later. Film hardness was measured using a BYK Gardner Pendulum Hardness Tester as König hardness (damping time in seconds) and MEK resistance by number of double rubs to mar and to failure (>50% of the paint film is removed), the test is stopped after 200 rubs with no damage.

The film had a good appearance, a hardness (after twenty-four hours of drying) in the König test of 131 s (ambient curing) and 109 s (cured for five minutes at 65° C.).

Example 8

Purification of Ethylene Urea 401.6 g (4.66 mol) of commercially available anhydrous ethylene urea of 96% purity were charged to a flask containing 700 g of 2B ethanol (ethanol denatured with addition of toluene in a mass fraction of 0.5%, further containing a mass fraction of 7.5% of water) with stirring. The resulting slurry was then heated to 70° C. and held until the majority of the ethylene urea had dissolved. The hot ethanolic ethylene urea solution was then filtered through a fluted Whatman 2V paper filter cone of medium porosity. The filtrate was then allowed to slowly cool for 45 minutes and then was placed in an ice/water bath for two hours. The resulting precipitated white crystals were then captured using a glass fritted Buchner funnel under reduced pressure. 326 g of wet crystals were obtained which subsequently were washed with a portion of cold (0° C.) ethanol, and then air oven dried at 59° C. for three hours to give a final yield of 298 g of colourless ethylene urea crystals of approximately 99.4% purity, as verified by high pressure liquid chromatography.

Example 9

Reaction Product of Commercial Grade Ethylene Urea, Glyoxal and Methanol

A resin according to the invention was prepared by the following procedure: 72.3 g (0.498 mol) of an aqueous solution of glyoxal (ethane dial, with a mass fraction of solute of 40%) and 125 g (3.9 mol) of methanol were charged to a reaction vessel under a nitrogen purge and the pH was adjusted to 6.1 with aqueous sodium bicarbonate solution (with a mass fraction of solids of 6%). 43 g (0.5 mol) of commercially available anhydrous ethylene urea (2-imidazolidinone, solid, 96% purity) were added, and the resulting mixture was heated to a temperature of between 50° C. and 55° C. and held for ninety minutes under stirring. At the end of ninety minutes the reaction mixture was cooled to ambient, the pH of the reaction solution was adjusted to about 2.9 by addition of concentrated sulphuric acid (with a mass fraction of solute of 98%) and the reaction temperature was then raised and maintained at (55±4) ° C. for two hours. At the end of two hours of methylation, the reaction mixture was again cooled to ambient and the pH was adjusted to 7.4 by addition of aqueous sodium bicarbonate solution (with a mass fraction of solids of 6%) to give the final product resin. The Hazen Colour (determined in accordance with DIN-ISO 6271) was 168.

Example 10

Reaction Product of Purified Ethylene Urea, Glyoxal and Methanol

The procedure of Example 9 was repeated using the purified 99.4% ethylene urea of example 8 in place of the 96% commercial grade ethylene urea. A product having a Hazen Colour (determined in accordance with DIN-ISO 6271) of 37 was obtained.

Example 11

Preparation of Water Borne Coating Compositions

A clear film-forming composition using a water borne emulsion of an acrylic resin having a mass fraction of solids of 50% solids, and a specific amount of substance of hydroxyl groups n(OH)/m(Resin) of 0.731 mol/kg was prepared by mixing together the following ingredients: 21.9 g of the cross linker of Example 3 was added to 63 grams of the acrylic emulsion and mixed. Then 0.9 g of methoxy propanol was added to the mixture and mixed. Finally, 4.5 g of a solution of pTSA as used in Example 7 and 9.7 g of water were added and mixed to provide a coating formulation with a mass fraction of solids of 45% and an overall mass ratio of binder to crosslinker of 70/30.

Films were prepared by applying the coating composition thus prepared to the surface of iron-phosphated steel panels (101.6 mm×304.8 mm; 4"×12") and glass panels (76.2 mm×152.8 mm; 3"×6") using a wire-wound coating bar #52 to drawdown the coating composition resulting in a film of uniform thickness. The coated panel was then allowed to flash at room temperature (20° C. to 25° C.) for fifteen minutes. The coatings were allowed to cure either twenty-four hours at ambient conditions (20° C. to 25° C.), or were cured for five minutes at 65° C., and measured twenty-four hours later. Clear films with good appearance and a dry film thickness of 45.7 im (1.8 mils) were obtained. Film hardness according to König (ASTM D 4366=DIN EN ISO 1522) was measured using a BYK Gardner Pendulum Hardness Tester, and MEK resistance was determined by counting the number of double rubs to mar and to failure (more than 50% of the coating layer removed), the test is stopped after 200 rubs with no damage. Cured paint films with good performance were obtained also at low curing temperature.

The following values were measured:

|  | Cured at | |
| --- | --- | --- |
|  | ambient (20° C. . . . 25° C.), 24 h | 65° C., 5 min |
| König Hardness | 105 s | 96 s |
| MEK resistance (number of double rubs) | 200 | 200 |

The invention claimed is:

1. The reaction product UA of at least one multifunctional aldehyde A with at least one cyclic urea U made by
   a) mixing the at least one multifunctional aldehyde A with the at least one cyclic urea U in the presence of at least one alcohol $R^1$—OH to effect an addition reaction, optionally, in the presence of at least one solvent that has no reactive groups which may react with aldehyde groups, —CO—NH— groups, or hydroxyl groups, to obtain a solution of a product UA, where $R^1$ is selected from the group consisting of linear, branched or cyclic alkyl groups having from one to twelve carbon atoms which may be interrupted by one or more of —O—, —NR"—, —S—, where R" stands for H, or an alkyl group having from one to six carbon atoms, with the proviso that not two —O— or not two —S— atoms may be immediately adjacent, characterised in that the cyclic urea U is selected from the group consisting of ethylene urea, 1,3-propylene urea, 1,2-propylene urea, 1,4-butylene urea, and glycol uril,
   and wherein after the addition reaction of step a),
   b) the pH is adjusted to at most 5.0,
   c) optionally, adding a further quantity of the said alcohol $R^1$—OH, and optionally, adding at least one solvent that has no reactive groups which react with aldehyde groups, —CO—NH— groups, or hydroxyl groups, and etherifying under acid conditions, and
   d) adding
      d1) either, a further alcohol $R^2$—OH which has at least one carbon atom in its molecule more that there is in $R^1$—OH, optionally, adding at least one solvent that has no reactive groups which react with aldehyde groups, —CO—NH— groups, or hydroxyl groups, and etherifying under acid conditions,
      d2) or, a further quantity of the said alcohol $R^1$—OH, optionally, adding at least one solvent that has no reactive groups which react with aldehyde groups, amide groups, or hydroxyl groups, and etherifying under acid conditions.

2. The reaction product UA of claim 1 characterised in that its degree of etherification, measured as the ratio n(—O—R)/n(U) of the amount of substance n(—O—R) of alkoxy groups to the amount of substance n(U) of cyclic urea U chemically bound in the reaction products, is at least 0.01 mol/mol, wherein the amount of substance of alkoxy groups is equal to the amount of substance n (—O—$R^1$) of alkoxy groups —O—$R^1$ present in the etherified product, or, if alkoxy groups —O—$R^2$ are present, the sum of the amount of substance n (—O—$R^1$) of alkoxy groups —O—$R^1$ and the amount of substance n (—O—$R^2$) of alkoxy groups —O—$R^2$ present in the etherified reaction product.

3. The reaction product UA of claim 1 characterised in that the aldehyde A is glyoxal or a mixture comprising glyoxal.

4. The reaction product UA of claim 1 characterised in that the cyclic urea U is ethylene urea or a mixture comprising ethylene urea.

5. A method of use of the reaction product UA of claim 1 as crosslinker for substrates selected from the group consisting of paper, textiles, wood, fabricated wood, leather, and cellulosic materials, comprising mixing at least one of catalysts, fillers, wetting agents, solvents, and diluents, to the reaction product UA to form a crosslinker composition, and applying the crosslinker composition to the substrate.

6. A method of use of the reaction product UA of claim 1 as crosslinker in coating compositions, comprising admixing the said reaction product UA to a binder resin having at least one of hydroxy functional groups, acid functional groups, amino functional groups, imino functional groups, amide functional groups, imide functional groups, mercaptan functional groups, and phosphine functional groups, homogenising, and applying the homogenised mixture to a substrate by spraying, brushing, wire coating, curtain coating, dipping, electrophoretic deposition, powder spraying, or electrostatic spraying.

7. The method of claim 6 wherein at least one of water, an organic solvent, a catalyst, a pigment, a light stabiliser, a defoamer, a levelling agent, a wetting agent, a thickening agent, an anti settling agent, an antiskinning agent, and a preservative, is added to the mixture of the reaction product UA and the binder resin.

8. The method of claim 6, characterised in that the substrate is selected from the group consisting of plastics, plastic composite materials, thermoplastics, thermoset plastics, glass, ceramics, wood, fabricated wood, leather, textiles, paper, cardboard, plaster, concrete, stone, semiconductor surfaces, and metals.

9. The method of use of claim 6 comprising adding boric acid to the reaction product UA, or to at least one of the cyclic urea U and the multifunctional aldehyde A, or to the binder resin, or to both the reaction product UA and to the binder resin, or to their mixture.

10. A composition of matter comprising the reaction product UA of claim 1 and at least one binder resin having at least one of hydroxy functional groups, acid functional groups, amino functional groups, imino functional groups, amide functional groups, imide functional groups, mercaptan functional groups, and phosphine functional groups.

11. The reaction product UA of claim 1 characterised in that the at least one alcohol $R^1$—OH is aliphatic.

12. The reaction product UA of claim 1 characterised in that the further alcohol $R^2$—OH is aliphatic.

* * * * *